United States Patent [19]

Lechon et al.

[11] Patent Number: 4,799,816
[45] Date of Patent: Jan. 24, 1989

[54] CONNECTION DEVICE FOR A GUIDE LINE OF AN UNDERSEA INSTALLATION

[75] Inventors: Alain Lechon; Yves Le Luel, both of Pau, France

[73] Assignee: Societe Nationale Elf Aquitaine (Production), Courbevoie, France

[21] Appl. No.: 52,235

[22] Filed: May 19, 1987

[30] Foreign Application Priority Data

May 23, 1986 [FR] France .................. 86 07370

[51] Int. Cl.⁴ ............................................. F16D 9/00
[52] U.S. Cl. ....................................... 403/2; 405/224; 166/342; 285/3
[58] Field of Search ................ 405/224; 166/342, 343; 403/2; 285/3, 4, 2

[56] References Cited

U.S. PATENT DOCUMENTS

| | | | |
|---|---|---|---|
| 3,163,228 | 12/1964 | Hayes | 166/214 |
| 4,120,171 | 10/1978 | Chateau et al. | 405/169 |
| 4,400,112 | 8/1983 | Castel et al. | 405/224 |
| 4,452,472 | 6/1984 | Crase | 285/3 |

FOREIGN PATENT DOCUMENTS

| | | |
|---|---|---|
| 1249789 | 9/1967 | Fed. Rep. of Germany . |
| 988246 | 4/1965 | United Kingdom . |
| 2161538 | 1/1986 | United Kingdom . |

*Primary Examiner*—Andrew V. Kundrat
*Attorney, Agent, or Firm*—Poms, Smith, Lande & Rose

[57] ABSTRACT

A device is provided for connecting a guide line of an undersea installation. Inside the body of the connector is fixed an axial rod supporting a locking jacket with fingers carried by resilient blades. The rod ends in a centering nose having a cut out, whereas, above the centering nose a sliding ring is mounted on the rod and is held in position by a shearable pin. The guide post has a bore whose divergent section forms with a divergent face a housing for the locking fingers. When, for unlocking the connection, a tractive force is exerted on the connector body, the pin is sheared and the ring, by sliding, opens the passage for the fingers, which allows the connector to be released and raised. This connector requires no angular position with respect to the guide rod and makes any disconnecting tool superfluous.

8 Claims, 1 Drawing Sheet

U.S. Patent   Jan. 24, 1989   4,799,816
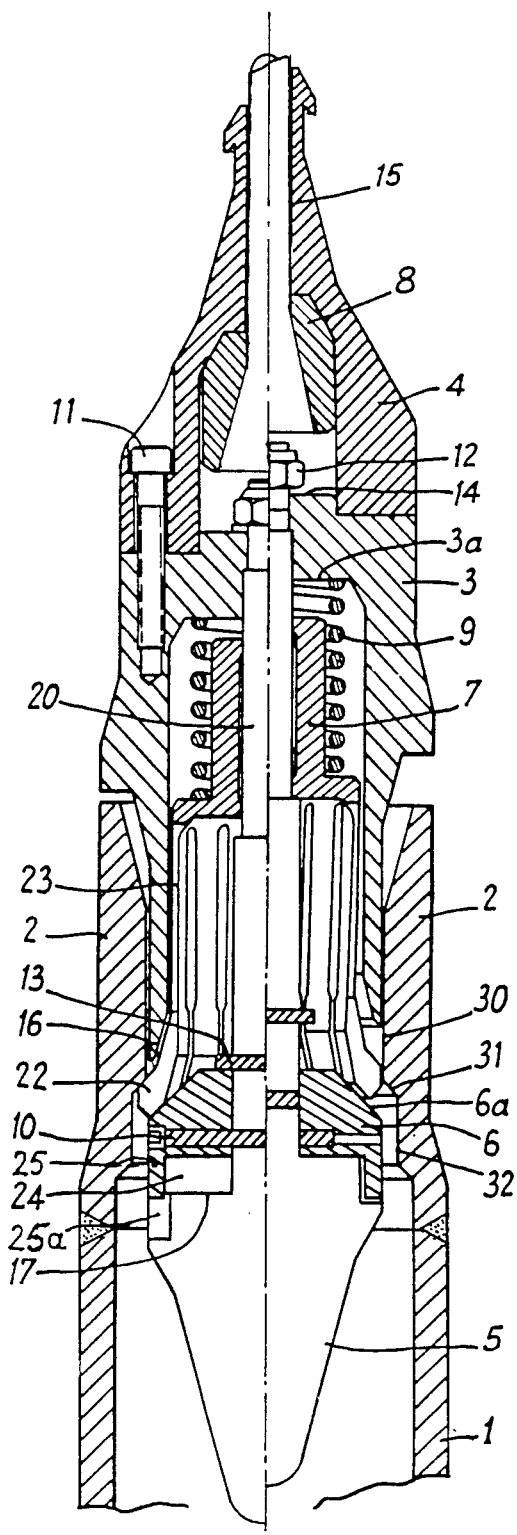

CONNECTION DEVICE FOR A GUIDE LINE OF AN UNDERSEA INSTALLATION

BACKGROUND OF THE INVENTION

1. Field of the Invention

The present invention relates to a disconnectable connection device for a guide line connecting a floating support such as a barge, to an undersea installation having a guide post sleeve. More particularly, the action for locking and unlocking the device of the invention takes place without the help of a diver from the floating support.

2. Description of the Prior Art

Such a device is known which is described in the French Pat. No. 2 497 899 in the name of the applicant. In the construction described, locking is effected by angularly positioning the connector, by means of inclined ramps, in the sleeve of the guide post so that a mobile bolt body penetrates into a transverse bore in the bolt head, said bore opening freely outside the device. Such an arrangement allows the connector to be disconnected by means of a disconnecting tool, whose two fingers exert a thrust on said mobile bolt body which retracts so as to free the connector from its housing.

SUMMARY OF THE INVENTION

The present invention relates to a connector which, on the one hand, does not require the connector to be angularly positioned with respect to the sleeve and, on the other hand, makes any use of a disconnecting tool unnecessary. The disconnectable connection device for a guide line connecting a floating support to an undersea installation having a guide post sleeve in accordance with the invention is characterized in that it includes a connector body connected to a guide line, inside which body a securing means retains a rod supporting a locking jacket having in its extension fingers supported by resilient blades, a sliding ring having at its upper part a conical divergent external face being retractably mounted on said rod, the sleeve of the guide post having an inner conical diverging face, the conical faces of the retractable ring and the sleeve forming bearing surfaces for a housing between which the fingers are housed and locked, when the ring remains retained on the rod by retractable securing means, whereas said bearing surfaces for locking the fingers are adapted to move away from each other while freeing the fingers from their housing, when the retractable securing means are actuated, so as to open a passage for the fingers which, thus freed, cause the disconnection of the connector from the sleeve.

Preferably, the angle in the axial plane of the two opposite faces of the fingers coming into contact with the conical bearing surfaces of the ring and of the sleeve is identical to the angle which these bearing surfaces form therebetween. The two bearing surfaces are advantageously parallel and slanted at 45°.

In a preferred embodiment, the retractable securing means consist of a shearable pin by means of which the sliding ring is retained on the rod.

The rod may preferably end in a centering nose, so that, when the pin is sheared under the effect of the tractive force exerted on the connector body, the sliding ring slides so as to occupy the space which separated it previously from the shoulder of the centering nose.

Preferably, the locking jacket is urged with a thrusting force by a spring bearing on an inner shoulder of the connector body.

BRIEF DESCRIPTION OF THE DRAWING

Other features of the invention will be clear from the description of one embodiment given by way of example and illustrated by a FIGURE showing the device of the invention in axial section, the left hand portion of the drawing showing the connector in the locked state and the right hand part the connector at the time of unlocking.

DESCRIPTION OF THE PREFERRED EMBODIMENT

The connector body is formed of an upper part 4 secured by means of bolts 11 to the lower part 3 having a shoulder, with two bearing faces 3a and 14.

An axial rod 20 is fixed by means of a nut 12 applied against the face 14 of the connector body. This rod 20 carries a locking jacket 7 which includes, in its extension fingers 22 supported by resilient blades 23 which push the fingers outwardly in the rest position. Blades 23 are surrounded by the lower ends 16 of the lower part 3 of the connector body. The rod 20 ends in a centering nose 5 with a shoulder 17.

At the lower end of rod 20 is fixed a sliding ring 6. This ring has four projecting portions 25 extending below the body of the ring. In the locking position (left hand part of the drawing), ring 6 is held just above the centering nose by a pin 10 with a space 24 separating the ring from shoulder 17. The centering nose 5 includes, opposite the projecting portions 25, four cut outs 25a serving as guide for angularly orientating the ring during fitting of pin 10.

For ease of mounting ring 6 on rod 20, the rod has a stop 13 forming a reference for positioning the ring in height. A spring 9 wound about the locking jacket 7 bears on face 3a of the shoulder of part 3 of the connector body and applies a thrust to the jacket.

A guide post 1, forming part of the undersea base, is provided with a sleeve 2 inside which the lower part 3 of the connector body must penetrate by means of the centering nose 5 of rod 20. The internal bore of sleeve 2, has, from top to bottom, first of all a section with cylindrical wall 30 of a diameter slightly greater than the outer diameter of the lower end 16 of the lower part 3 of the connector body, then a section with a divergent conical wall 31, which section extends into a section with a cylindrical wall 32 of a diameter at which the conical divergent wall 31 ends.

The sliding ring 6 has at its upper part a conical divergent external face 6a so as to form, with the conical wall 31, of the sleeve, bearing surfaces between which fingers 22 are housed and locked when ring 6 remains retained on rod 20 by the pin 10.

The faces of the fingers intended to be retained between the conical bearing surfaces 31 and 6a are slanted at 45° and are parallel to each other, like the bearing surfaces 31 and 6a.

For locking the connector carried by a guide line 15 retained in the connector by means of a securing means 8, the connector is lowered, with ring 6 fixed on rod 20 by means of pin 10 with spacing above shoulder 17, the centering nose penetrates into sleeve 2 and, with the locking jacket 7 pushed downwards by spring 9, the fingers 22, during lowering, are first of all clamped together because of the narrow passage provided by the cylindrical wall section 30 of the sleeve, then, arriving at the level of the section of the sleeve with divergent conical wall 31, they move away from each other. The space between the bearing surface 6a of ring 65 and 31 of the wall being calculated so as to house or receive fingers 22, the slant of the slopes of the bearing surfaces being identical to that of the faces of the fingers intended to engage with these bearing surfaces, fingers 22 pushed outwardly by the resilience of the blades 23 which support them penetrate inside this housing and remain locked there thus providing a reliable connection between the connector and the sleeve.

For unlocking the connection, a tractive force is exerted on the body of the connector by means of guide line 15. This tractive force is transmitted to rod 20 and to ring 6 locked on the rod. When the tractive force exceeds a calculated threshold, pin 10 is sheared and ring 6, thus released from its connection with rod 20 on which the tractive force continues to be exerted, tends to fall back onto shoulder 17 while occupying the space 24 which separated it beforehand from said shoulder 17. However, with the rod and the centering nose continuing their upward movement, shoulder 17 moves up so as to serve as support for the ring. In other words, the ring begins a downward movement opening the passage for the fingers, but it comes rapidly into abutment against the shoulder of the centering nose. During the upward movement of the connector body, the lower end 16 of the lower portion 3 of the body moves upward.

The fingers, sliding along the conical wall 31 of the housing, come together for engagement in the cylindrical wall section 30 of restricted diameter. The connection is thus unlocked and the connector may be raised without leaving inside the sleeve any part which forms, it, such as pin debris.

Other retractable securing means may be used for retractably retaining the sliding ring 6 on rod 20, for example spring type means.

The invention is not limited to the embodiment described above, it is susceptible of numerous variants within the scope of a man skilled in the art.

What is claimed is

1. A disconnectable connection device for a guide line connecting a floating support to an undersea installation having a guide post sleeve, including in combination:
   a connector body having a connection to said guide line and having an axially extending body chamber;
   a rod carried by said body within said body chamber in axial relation thereto;
   a locking jacket supported by said rod within said chamber;
   resilient finger blades carried by said jacket and provided with locking fingers at the ends of said resilient blades;
   a slidable ring carried by said rod below said jacket, said ring having an external conical divergent face adjacent said locking fingers;
   said guide post sleeve having an internal conical diverging face opposed to said conical face on said ring; said divergent faces on said ring and on said sleeve providing a space for receiving and housing said locking fingers when said connector body, rod, and jacket are in locked position in said guide post sleeve;
   a releasable securing means for retaining said ring in locking position on said rod;
   said conical faces on said ring and on said sleeve being movable away from each other for freeing said fingers from the space between said conical faces when said securing means is released for opening a passage for said fingers which, upon being so freed, cause the disconnection of the connector from the sleeve.

2. A device as claimed in claim 1 wherein said fingers are enlarged and include angularly disposed opposite faces for engaging said conical bearing surfaces of said ring and said sleeve in parallel corresponding relation.

3. A device as claimed in claim 2 wherein said bearing surfaces are parallel and slanted at an angle of 45° to the axis of said rod.

4. A device as claimed in claim 1 wherein
   said releasable securing means inclues a shearable pin by means of which said slidable ring is retained on the rod.

5. A device as claimed in claim 4 wherein
   said rod includes a centering nose having a shoulder, said slidable ring being retained by said shearable pin on the end of the rod in spaced relation to said shoulder of said nose; whereby shearing of said pin upon imparting a tractive force to the connector body causes the slidable ring to occupy said space between said shoulder and the ring to support the ring on said shoulder.

6. A device as claimed in claim 1 including a spring between said locking jacket and said connector body for biasing said locking jacket toward locking position.

7. A device as claimed in claim 1 wherein
   said guide post sleeve has a first section with a cylindrical wall having an inner diameter slightly greater than the outer diameter of the lower end of the lower part of the connector body, said inner diameter of the cylindrical wall merging into a section with said conical diverging face, which latter section merges into a cylindrical wall section of a diameter at which the conical divergent face ends.

8. A disconnectable connection device for a guide line for an undersea installation which includes a guide post sleeve having an open top end, the combination of:
   means including a connector body carried by said guide line, said connector body having a lower end portion receivable within said open top end of said guide post sleeve and including a body chamber open at its lower end;
   a rod carried by said connector body in said chamber and having an enlarged lower guide nose portion;
   means for locking said connector body to said guide post sleeve including a locking jacket carried by said rod within said body chamber;
   said locking jacket having locking fingers extending beyond the open end of the lower part of the body;
   means carried by the lower end of said rod below said locking fingers and slidable axially on said rod from locked position to unlocked position;
   said slidable means and said guide post sleeve having parallel spaced apart angularly disposed surfaces for engagement by corresponding surfaces provided on said locking fingers;
   a releasable means connecting said slidable means to said rod and subject to release upon application of a tractive force by said guideline;
   and a spring biasing said locking jacket toward said slidable means for biasing said locking jacket toward locked position.

* * * * *